United States Patent
Greve

(10) Patent No.: US 8,372,493 B2
(45) Date of Patent: Feb. 12, 2013

(54) EMBLEM ASSEMBLY AND METHOD OF FORMING SAME

(75) Inventor: Bruce N. Greve, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 12/892,027

(22) Filed: Sep. 28, 2010

(65) Prior Publication Data

US 2012/0076959 A1    Mar. 29, 2012

(51) Int. Cl.
    B60R 13/00    (2006.01)
(52) U.S. Cl. ............. 428/31; 428/13; 428/14; 428/67; 428/187; 428/203; 428/913.3
(58) Field of Classification Search ........... 428/13, 428/14, 31, 187, 203, 913.3
See application file for complete search history.

(56) References Cited

U.S. PATENT DOCUMENTS

| | | | |
|---|---|---|---|
| 4,076,789 A | 2/1978 | Geller et al. | |
| 4,130,623 A | 12/1978 | Walter | |
| 4,481,160 A * | 11/1984 | Bree | 264/135 |
| 4,556,588 A * | 12/1985 | Rockwood | 428/13 |
| 4,769,100 A | 9/1988 | Short et al. | |
| 4,824,506 A | 4/1989 | Hoerner et al. | |
| 4,828,637 A | 5/1989 | Mentzer et al. | |
| 4,838,973 A | 6/1989 | Mentzer et al. | |
| 4,868,030 A | 9/1989 | Mentzer et al. | |
| 4,957,802 A | 9/1990 | Mentzer et al. | |
| 4,960,558 A | 10/1990 | Short | |
| 4,976,896 A | 12/1990 | Short et al. | |
| 5,021,278 A | 6/1991 | Short | |
| 5,698,276 A * | 12/1997 | Mirabitur | 428/31 |
| 5,933,867 A * | 8/1999 | Corder | 2/160 |
| 6,682,805 B1 | 1/2004 | Lilly | |
| 6,863,854 B2 | 3/2005 | Lilly | |
| 7,390,454 B2 | 6/2008 | Ostrander et al. | |
| 7,645,416 B2 | 1/2010 | Buehler et al. | |

OTHER PUBLICATIONS

U.S. Appl. No. 13/343,763, filed Jan. 5, 2012; Catherine A. Ostrander, Kitty L. Gong, Charles K. Buehler, Chris A. Oberlitner.
U.S. Appl. No. 13/303,729, filed Nov. 23, 2011; Catherine A. Ostrander, Kitty L. Gong, Charles K. Buehler, Chris A. Oberlitner.
U.S. Appl. No. 13/361,173, filed Jan. 30, 2012; Catherine A. Ostrander, Joel Colombo, Mary K. Gusie, Kitty L. Gong, Charles K. Buehler, Michael P. Balogh.

* cited by examiner

*Primary Examiner* — Cathy Lam
(74) *Attorney, Agent, or Firm* — Quinn Law Group, PLLC

(57) ABSTRACT

An emblem assembly configured for attachment to a vehicle includes a first element having a first surface and a second surface recessed from the first surface, wherein the first element defines at least one void therethrough extending through the second surface. The emblem assembly includes a second element having a third surface, a fourth surface spaced apart from the third surface, and a fifth surface extending between the third surface and the fourth surface, wherein the second surface is spaced apart from the fifth surface to define a channel therebetween. The emblem assembly includes a coating disposed on the third surface and a sealant disposed adjacent and in contact with at least a portion of each of the void, the second surface, the coating, and the fifth surface to thereby fill at least a portion of the channel. A method of forming the emblem assembly is also disclosed.

16 Claims, 3 Drawing Sheets

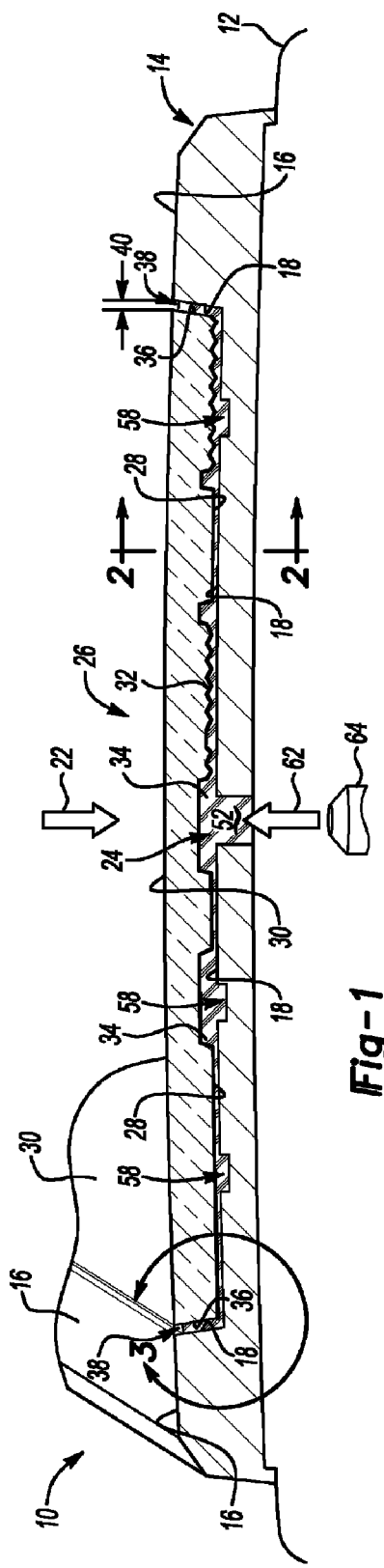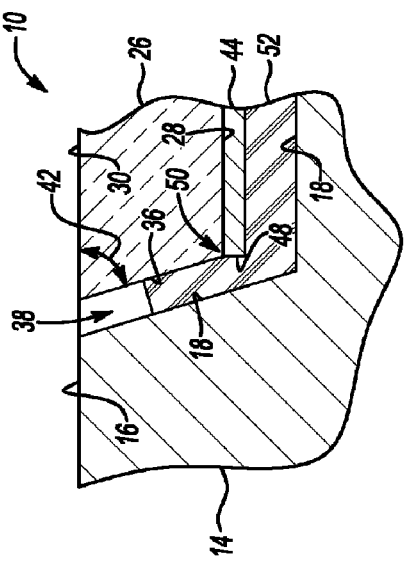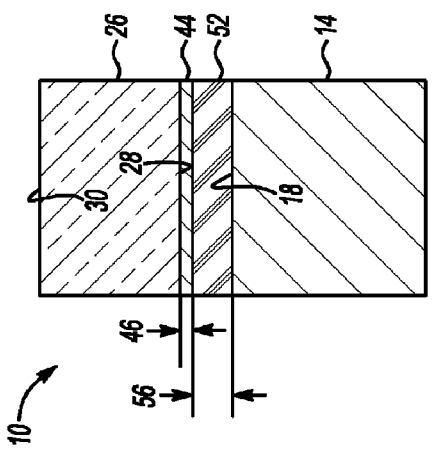

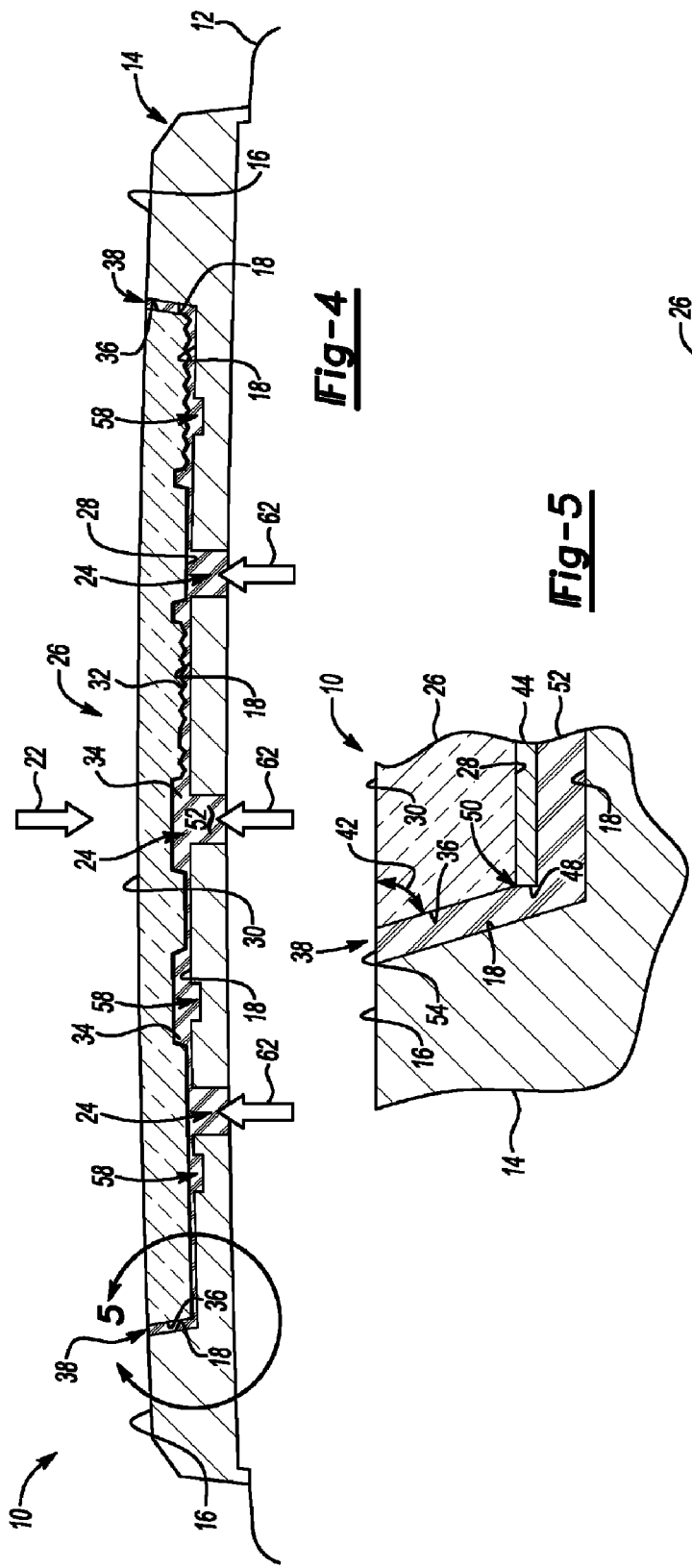

EMBLEM ASSEMBLY AND METHOD OF FORMING SAME

TECHNICAL FIELD

The present disclosure generally relates to emblem assemblies configured for attachment to a vehicle.

BACKGROUND

Vehicles often include distinctive badging, such as emblems, to denote a brand and/or manufacturer of the vehicle. Such emblems are generally designed to convey a positive and easily-recognizable association between the vehicle and the manufacturer of the vehicle, and are therefore often attached to visible exterior and interior surfaces of the vehicle, e.g., front grilles, rear liftgates and trunks, wheel covers, and/or steering wheels. Any defect or degradation of the emblem may diminish the perceived quality of the vehicle and/or tarnish the reputation of the vehicle manufacturer.

SUMMARY

An emblem assembly configured for attachment to a vehicle includes a first element and a second element. The first element is configured for attachment to the vehicle and has a first surface and a second surface recessed from the first surface, wherein the first element defines at least one void therethrough extending through the second surface. The second element is configured for attachment to the first element and has a third surface, a fourth surface spaced apart from the third surface, and a fifth surface extending between the third surface and the fourth surface, wherein the first surface is spaced apart from the fifth surface to define a channel therebetween. The emblem assembly further includes a coating disposed on the third surface, and a sealant disposed adjacent and in contact with at least a portion of each of the void, the second surface, the coating, and the fifth surface to thereby fill at least a portion of the channel.

In one variation, the coating includes vacuum metalized aluminum and is substantially free from degradation. Further, the first element defines a plurality of voids therethrough, each extending through the second surface. In addition, the sealant includes a silicone and the second element is transparent. Further, the fifth surface abuts the third surface to form a corner. The sealant is disposed adjacent and in contact with at least a portion of each of the void, the second surface, the coating, and the fifth surface to thereby wrap around the corner, fill at least a portion of the channel, and adhere the second element to the first element.

A method of forming the emblem assembly includes inserting the second element into the first element to define the channel therebetween. After inserting, a sealant transitionable between a flowable form and a cured form is injected into the at least one void whereby the sealant contacts at least a portion of each of the void, the second surface, the coating, and the fifth surface to thereby form the emblem assembly.

The emblem assembly, and more specifically the coating of the emblem assembly, exhibits minimized degradation over an operating life of a vehicle. For example, the coating is substantially free from corrosion after prolonged exposure to cleaning solutions and vehicle operating environments. In particular, the sealant sufficiently seals the channel of the emblem assembly to prevent ingress of fluids and/or contaminants to thereby minimize contact between such fluids and/or contaminants and the coating. Further, the method allows for economical and efficient formation of the emblem assembly, and the emblem assembly contributes to an increased perceived quality of the vehicle.

The above features and advantages and other features and advantages of the present disclosure are readily apparent from the following detailed description of the best modes for carrying out the disclosure when taken in connection with the accompanying drawings.

BRIEF DESCRIPTION OF THE DRAWINGS

FIG. 1 is a schematic cross-sectional view of an emblem assembly having a planar configuration and including a first element and a second element;

FIG. 2 is a schematic cross-sectional view of the emblem assembly of FIG. 1 along section line 2-2;

FIG. 3 is a schematic cross-sectional view of a portion of the emblem assembly of FIG. 1;

FIG. 4 is a schematic cross-sectional view of another embodiment of the first element and emblem assembly of FIG. 1;

FIG. 5 is a schematic cross-sectional view of a portion of the emblem assembly of FIG. 4;

FIG. 6 is a schematic illustration of a method of forming the emblem assemblies of FIGS. 1 and 4.

DETAILED DESCRIPTION

Figure 7:
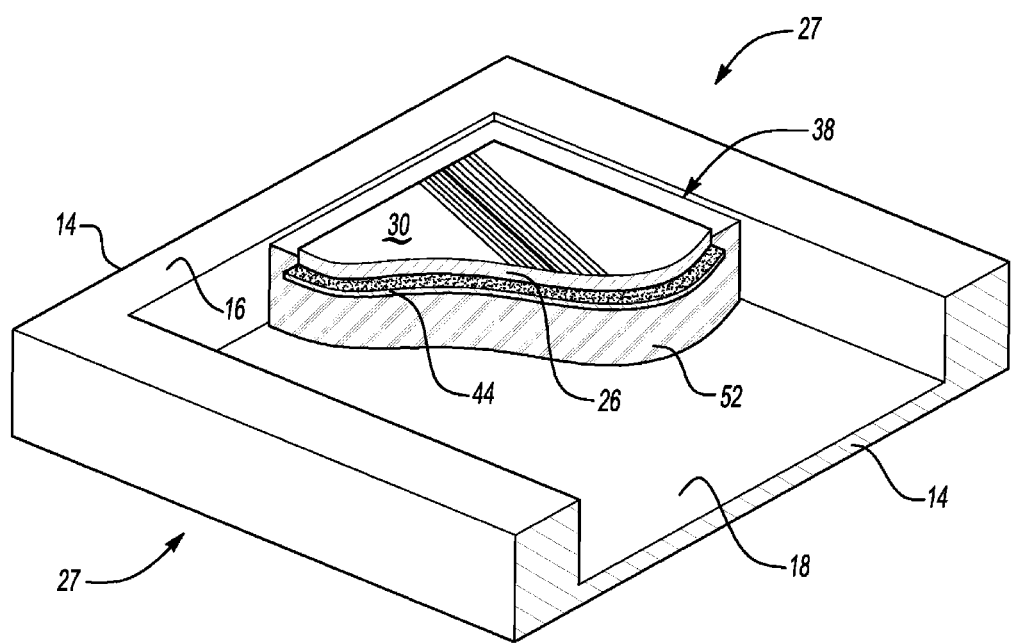
FIG. 7 is a schematic fragmentary perspective planar view of a corner configuration of the emblem assembly of FIG. 1.

Referring to the Figures, wherein like reference numerals refer to like elements, an emblem assembly is shown generally at 10 in FIG. 1. The emblem assembly 10 is configured for attachment to a vehicle 12, such as an automotive vehicle. However, the emblem assembly 10 may also be useful for non-automotive vehicles such as, but not limited to, construction, rail, aviation, and marine vehicles.

Referring again to FIG. 1, the emblem assembly 10 includes a first element 14 configured for attachment to the vehicle 12. The first element 14 may be, for example, a carrier or bezel and may be configured for attachment to any location or component (not shown) of the vehicle 12, such as, but not limited to, a front grille, rear liftgate, trunk lid, wheel cover, side panel, trim panel, and/or steering wheel. The first element 14 may be attached to the vehicle 12 via any suitable method or attachment device, e.g., screws, tape, or a snap-fit. Therefore, the first element 14 may be formed from any suitable material and selected according to an expected operating environment of the vehicle 12. By way of non-limiting examples, the first element 14 may be formed from metal, plastic, and combinations thereof. In addition, the first element 14 may be coated for aesthetics and/or protection. For example, the first element 14 may be formed from chrome-plated plastic, such as acrylonitrile butadiene styrene (ABS).

With continued reference to FIG. 1, the first element 14 has a first surface 16 and a second surface 18 recessed from the first surface 16. That is, the second surface 18 may extend from the first surface 16 and define a recession or cavity 20 (FIG. 6) within the first element 14. In one example shown in FIG. 1, the second surface 18 may be substantially U-shaped. During vehicle operation, a portion of the first surface 16 may be visible to a potential occupant or operator of the vehicle 12 when viewed from a direction of arrow 22 (FIG. 1). In contrast, the second surface 18 may be substantially hidden by another component of the emblem assembly 10, as set forth in more detail below.

Referring to FIG. 1, the first element 14 defines at least one void 24 therethrough extending through the second surface 18. The at least one void 24 may be generally shaped to provide an injection port for transfer of material through the first element 14, and as such, may have any suitable shape. In another variation, as shown in FIG. 4, the first element 14 may define a plurality of voids 24, each extending through the second surface 18. The plurality of voids 24 may be spaced apart from one another in any suitable arrangement. For example, the plurality of voids 24 may be evenly or unevenly spaced from one another.

The emblem assembly 10 also includes a second element 26, as shown in FIG. 1. The second element 26 is configured for attachment to the first element 14 and may be generally sized and shaped to fit within the cavity 20 (FIG. 6) defined by the second surface 18 of the first element 14. For example, the second element 26 may be a lens configured for attachment to the aforementioned bezel, i.e., the first element 14. Further, comparatively more of the second element 26 may be visible to a potential occupant or operator of the vehicle 12 than the first element 14 when viewed from the direction of arrow 22. Therefore, the second element 26 may have a shape easily-recognizable as associated with a specific vehicle brand and/or manufacturer. For example, the second element 26 may have a square shape, a bowtie shape, a pointed shape, and/or may include a circular crest shape or a combination of letters. In addition, the second element 26 may have a shape that is the same or different than the shape of the first element 14.

Referring again to FIG. 1, the second element 26 has a third surface 28 and a fourth surface 30 spaced apart from the third surface 28. The third surface 28 may define a plurality of grooves 32 and/or ducts 34 configured for reducing a weight of the second element 26 and/or enhancing attachment between the first element 14 and the second element 26. In general, the third surface 28 may be hidden from view upon attachment of the emblem assembly 10 to the vehicle 12 when viewed from a direction of arrow 22. In contrast, the fourth surface 30 may be visible to a potential occupant or operator of the vehicle 12 upon attachment of the emblem assembly 10 to the vehicle 12 when viewed from the direction of arrow 22.

Referring again to FIG. 1, the second element 26 also has a fifth surface 36 extending between the third surface 28 and the fourth surface 30, wherein the fifth surface 36 is spaced apart from the second surface 18 to define a channel 38 therebetween. That is, when the second element 26 is attached to the first element 14, as set forth in more detail below, the second surface 18 is disposed adjacent the fifth surface 36 to define the channel 38 therebetween. The channel 38 may have a width 40 of from about 0.3 mm to about 0.7 mm, e.g., about 0.5 mm, so as to define a minimal gap between the first element 14 and the second element 26. As such, the fifth surface 36 may also be substantially hidden from a vehicle occupant or operator when the first element 14 is attached to the second element 26.

As shown in FIG. 3, the fifth surface 36 and at least one of the third surface 28 and the fourth surface 30 may define an angle 42 therebetween of less than or equal to 90°. That is, a portion of the second element 26 may be tapered. Alternatively, although not shown, the third surface 28 and the fourth surface 30 may each be substantially perpendicular to the fifth surface 36.

The second element 26 may be formed from any suitable material. For example, the second element 26 may be formed from plastic, such as acrylic, metal, such as aluminum, and combinations thereof. In addition, the second element 26 may be translucent, and/or may be tinted to a specific color, e.g., gold or red. In one variation, the second element 26 is transparent.

Referring now to FIG. 2, the emblem assembly 10 of FIG. 1 also includes a coating 44 disposed on the third surface 28. It is to be appreciated that for purposes of illustration the coating 44 is not visible in FIG. 1. However, the coating 44 is disposed on the third surface 28 of FIG. 1, as best shown in FIGS. 2 and 3. The coating 44 may be a layer capable of imparting enhanced aesthetics to the second element 26 and the emblem assembly 10. For example, the coating 44 may include aluminum to impart a sheen or metallic appearance to the second element 26.

The coating 44 may be deposited on the third surface 28 via any suitable process. More specifically, in one embodiment, the coating 44 may include vacuum metalized aluminum. That is, the coating 44 may be deposited onto the third surface 28 of the second element 26 via vacuum metallization. As used herein, the terminology "vacuum metallization" refers to a physical vapor deposition process capable of depositing a thin aluminum layer, i.e., the coating 44, onto a plastic component, e.g., the second element 26. The coating 44 may have a thickness 46 (FIG. 2) of from about 0.01 µm to about 0.2 µm. Further, the thickness 46 of the coating 44 may not substantially vary along the third surface 28, and the coating 44 may be disposed along the entire third surface 28, e.g., along any grooves 32 (FIG. 1) and/or ducts 34 (FIG. 1) defined by the third surface 28.

Additionally, for the variation including the transparent second element 26, the coating 44 may be visible through the fourth surface 30 when viewed from the direction of arrow 22 (FIG. 1). Therefore, to maximize the perceived quality of the vehicle 12, the coating 44 may be substantially free from degradation, such as, but not limited to, corrosion, delamination, chipping, tears, uneven thickness 46, uneven sheen or gloss, and combinations thereof.

As best shown in FIG. 3, the coating 44 may not extend along the fifth surface 36. That is, the coating 44 may have a boundary 48 that terminates at an intersection of the third surface 28 and the fifth surface 36. In one variation, as shown in FIG. 3, the fifth surface 36 abuts the third surface 28 to form a corner 50. Therefore, the coating 44 may be disposed solely along the third surface 28 so as not to wrap around the corner 50 of the second element 26.

Referring again to FIGS. 1 and 2, the emblem assembly 10 further includes a sealant 52 disposed adjacent and in contact with at least a portion of each of the void 24, the second surface 18, the coating 44, and the fifth surface 36 to thereby fill at least a portion of the channel 38. More specifically, the sealant 52 may fill the void 24, and may abut the second surface 18 and wrap around the corner 50 (FIG. 3) of the second element 26 to thereby act as an insulator from or barrier to environmental contaminants and/or fluids. Therefore, as best shown in FIG. 3, the sealant 52 also contacts the coating 44, e.g., at the boundary 48 of the coating 44, and fills at least a portion of the channel 38. Stated differently, the sealant 52 may extend from the second surface 18 into the channel 38 and seal at least a portion of the channel 38 and the coating 44 from the environment exterior to the vehicle 12. In this variation, therefore, the sealant 52 may not be visible when viewed from a direction of arrow 22 in FIG. 1.

Alternatively, as shown in FIGS. 4 and 5, the sealant 52 may substantially fill the channel 38. That is, the sealant 52 may be transitionable between a flowable form and a cured form, and may be injected through the at least one void 24 so as to fill the channel 38. The sealant 52 in the cured form may have an edge 54 (FIG. 5) that is substantially flush with the fourth surface 30. Therefore, in this variation, the sealant 52 may be visible when viewed from a direction of arrow 22 in FIG. 1.

In addition, the sealant 52 may adhere the second element 26 to the first element 14, as shown in FIGS. 1 and 4. More specifically, as best shown in FIG. 2, the sealant 52 may adhere the second surface 18 to the coating 44 so that the second element 26 is attached to the first element 14. The sealant 52 may be impermeable to environmental contaminants, e.g., dirt, rain, snow, and cleaning agents encountered during operation of the vehicle 12. The sealant 52 may have a thickness 56 (FIG. 2) of from about 0.2 mm to about 0.8 mm in the cured form. For example, the sealant 52 may have a thickness 56 of about 0.5 mm so as to contact each of the second surface 18 and the fifth surface 36 (FIG. 3) within the channel 38 (FIG. 3). Therefore, as best shown in FIG. 1, the fourth surface 30 may be substantially flush with the first surface 16. That is, the second element 26 may not protrude from the first element 14, but rather the fourth surface 30 of the second element 26 may be coplanar with the first surface 16 of the first element 14. Further, as shown in FIG. 7, the second element 26 may be disposed within a periphery 27 of the first element 14, and the sealant 52 may compress within the channel 38.

Suitable sealants 52 may be selected from the group including, but not limited to, hot-melt adhesives, two-component thermoset polymers, silicones, room-temperature-vulcanizing (RTV) silicone caulk, epoxy resins, acrylic resins, and combinations thereof. In addition, the sealant 52 may be polyamide-based, polyester-based, or polyolefin-based. The sealant 52 may also include additives such as, but not limited to, flow aids, colorants, catalysts, cross-linking agents, tackifying resins, waxes, plasticizers, stabilizers, flame retardants, fillers, and combinations thereof. In one variation, the sealant 52 may include a silicone. For example, the sealant 52 may be a room-temperature-vulcanizing (RTV) silicone curable to a flexible elastomer. As used herein, the terminology "room-temperature-vulcanizing (RTV)" refers to a material system capable of curing or cross-linking at room temperature and generally including reactive base polymers and strengthening fillers. The room-temperature-vulcanizing (RTV) silicone may be a one-component material system curable upon exposure to atmospheric humidity, or a two-component material system curable upon mixing of the two components at room temperature. A specific example of a suitable sealant 52 is 9732 RTV, commercially available from Bostik, Inc. of Wauwatosa, Wis.

In another variation, the sealant 52 may include a hot-melt adhesive. For example, the sealant 52 may include a hot-melt thermoplastic adhesive having a melt viscosity of from about 14,000 cps to about 22,000 cps at 215° C. (Brookfield Thermosel Spindel #27). As used herein, the terminology "hot-melt adhesive" refers to an adhesive designed to be melted upon exposure to an increased ambient temperature, e.g., from about 120° C. to about 275° C., and is distinguished from solvent-based adhesives. A specific example of a suitable sealant 52 is HM4156LV, commercially available from Bostik, Inc. of Wauwatosa, Wis.

Referring again to FIGS. 1 and 4, the second surface 18 may further define at least one trough 58 therein configured for channeling the sealant 52 in the flowable form along the second surface 18. Alternatively, the second surface 18 may define a plurality of troughs 58 therein each configured for channeling the sealant 52 along the second surface 18. The plurality of troughs 58 may be arranged in any suitable configuration. The one or more troughs 58 may guide and distribute the sealant 52 in the flowable form along the second surface 18 so as to ensure that each portion of the second surface is coated by the sealant 52.

Therefore, in one variation described with reference to FIGS. 4 and 5, the emblem assembly 10 includes the first element 14, the transparent second element 26, the coating 44 disposed on the third surface 28, wherein the coating 44 includes vacuum metalized aluminum and is substantially free from degradation, and the sealant 52 including the silicone disposed adjacent and in contact with at least a portion of each of the void 24 (FIG. 4), the second surface 18, the coating 44, and the fifth surface 36 to thereby fill at least a portion of the channel 38 and adhere the second element 26 to the first element 14.

The sealant 52 minimizes degradation of the coating 44 over an operating life of the vehicle 12. For example, the coating 44 is substantially free from corrosion after continued exposure to cleaning solutions and vehicle operating environments. In particular, the sealant 52 sufficiently seals the channel 38 to prevent ingress of fluids and/or contaminants to thereby minimize contact between such fluids and/or contaminants and the coating 44.

A method of forming the emblem assembly 10 is also disclosed and described with reference to FIGS. 1 and 6. Referring first to FIG. 6, the method includes inserting the second element 26 into the first element 14 to define the channel 38 (FIG. 1) therebetween. For example, inserting may include disposing or setting the second element 26 into the cavity 20 (FIG. 6) of the first element 14 in the direction of arrow 60 (FIG. 6) to thereby define the channel 38 between the second surface 18 and the fifth surface 36.

With continued reference to FIG. 1, the method further includes, after inserting, injecting (represented generally by arrows 62 in FIGS. 1 and 4) the sealant 52 transitionable between the flowable form and the cured form into the at least one void 24 whereby the sealant 52 contacts at least a portion of each of the void 24, the second surface 18, the coating 44 (FIG. 2), and the fifth surface 36 to thereby form the emblem assembly 10. The sealant 52 may be injected into the at least one void 24 in the flowable form, e.g., in liquid form, by any suitable process and/or device. For example, the sealant 52 may be injected into the at least one void 24 under pressure via a nozzle 64 of an injection device (not shown), such as a reservoir hot melt applicator, hot glue gun, or caulk gun, or by spraying the sealant 52 into the at least one void 24. The sealant 52 may be injected into the at least one void 24 at room temperature, or at an elevated temperature of from about 175° C. to about 250° C.

Referring to FIG. 1, as the sealant 52 is injected into the at least one void 24, the sealant 52 may travel along the second surface 18, e.g., through any troughs 58, so as to fill any grooves 32 and/or ducts 34 defined by the third surface 28 and spread to contact the fifth surface 36. That is, the sealant 52 may fill the channel 38 and thereby contact each of the second surface 18, the coating 44 (FIG. 2), and the fifth surface 36. Stated differently, injecting may include filling at least a portion of the channel 38 with the sealant 52 in the flowable form.

The sealant 52 may contact and extend from the second surface 18 into the channel 38 to thereby attach, e.g., adhere, the second element 26 to the first element 14. Consequently, inserting may include sealing the channel 38, and therefore each of the coating 44 and the fifth surface 36 to prevent ingress of contaminants and/or fluids into the channel 38. Inserting the sealant 52 into the at least one void 24 minimizes fluid and/or contaminant contact with each of the coating 44 and the fifth surface 36.

The method may further include, after injecting, curing the sealant 52 to thereby transition between the flowable form and the cured form. For example, curing may include increasing or decreasing the temperature of the sealant 52, adding or activating a catalyst within the sealant 52, activating a cross-linking agent within the sealant 52, exposing the sealant 52 to ultraviolet radiation, and combinations thereof. The method allows for economical and efficient formation of the emblem assembly 10, and the emblem assembly 10 contributes to an increased perceived quality of the vehicle 12.

While the best modes for carrying out the disclosure have been described in detail, those familiar with the art to which this disclosure relates will recognize various alternative designs and embodiments for practicing the disclosure within the scope of the appended claims.

The invention claimed is:

1. An emblem assembly configured for attachment to a vehicle, the emblem assembly comprising:
    a first element configured for attachment to the vehicle and having a first surface and a second surface recessed from said first surface, wherein said first element defines at least one void therethrough extending through said second surface;
    a second element configured for attachment to said first element and having;
        a third surface;
        a fourth surface spaced apart from said third surface; and
        a fifth surface extending between said third surface and said fourth surface, wherein said second surface is spaced apart from said fifth surface to define a channel therebetween;
    a coating disposed on said third surface; and
    a sealant disposed adjacent and in contact with at least a portion of each of said void, said second surface, said coating, and said fifth surface to thereby fill at least a portion of said channel, wherein said sealant is transitionable between a flowable form and a cured form.

2. The emblem assembly of claim 1, wherein said coating is substantially free from corrosion.

3. The emblem assembly of claim 1, wherein said sealant adheres said second element to said first element.

4. The emblem assembly of claim 1, wherein said sealant adheres said second surface to said coating.

5. The emblem assembly of claim 4, wherein fourth surface is substantially flush with said first surface.

6. The emblem assembly of claim 1, wherein said sealant substantially fills said channel.

7. The emblem assembly of claim 1, wherein said sealant has an edge that is substantially flush with said fourth surface in said cured form.

8. The emblem assembly of claim 1, wherein said sealant has a thickness of from about 0.2 mm to about 0.8 mm in said cured form.

9. The emblem assembly of claim 1, wherein said sealant includes a silicone.

10. The emblem assembly of claim 1, wherein said coating includes aluminum.

11. The emblem assembly of claim 1, wherein said fifth surface and at least one of said third surface and said fourth surface defines an angle therebetween of less than or equal to 90°.

12. The emblem assembly of claim 1, wherein said second surface is substantially U-shaped.

13. The emblem assembly of claim 1, wherein said second surface further defines at least one trough therein configured for channeling said sealant in said flowable form along said second surface.

14. An emblem assembly configured for attachment to a vehicle, the emblem assembly comprising:
    a first element configured for attachment to the vehicle and having a first surface and a second surface recessed from said first surface, wherein said first element defines a plurality of voids therethrough each extending through said second surface;
    a transparent second element configured for attachment to said first element and having;
        a third surface;
        a fourth surface spaced apart from said third surface; and
        a fifth surface extending between said third surface and said fourth surface, wherein said fifth surface abuts said third surface to form a corner and wherein said second surface is spaced apart from said fifth surface to define a channel therebetween;
    a coating disposed on said third surface, wherein said coating includes vacuum metalized aluminum and is substantially free from corrosion; and
    a sealant including a silicone and disposed adjacent and in contact with at least a portion of each of said plurality of voids, said second surface, said coating, and said fifth surface to thereby wrap around said corner, fill at least a portion of said channel, and adhere said second element to said first element, wherein said sealant is transitionable between a flowable form and a cured form.

15. The emblem assembly of claim 14, wherein said second surface further defines a plurality of troughs therein each configured for channeling said sealant along said second surface.

16. The emblem assembly of claim 14, wherein said coating is visible through said fourth surface.

* * * * *